(12) United States Patent
Peters et al.

(10) Patent No.: US 6,920,555 B1
(45) Date of Patent: Jul. 19, 2005

(54) METHOD FOR DEPLOYING AN IMAGE INTO OTHER PARTITION ON A COMPUTER SYSTEM BY USING AN IMAGING TOOL AND COORDINATING MIGRATION OF USER PROFILE TO THE IMAGED COMPUTER SYSTEM

(75) Inventors: Chuck Peters, Omaha, NE (US); Steve Fairbanks, Draper, UT (US)

(73) Assignee: Powerquest Corporation, Orem, UT (US)

(*) Notice: Subject to any disclaimer, the term of this patent is extended or adjusted under 35 U.S.C. 154(b) by 647 days.

(21) Appl. No.: 09/810,874

(22) Filed: Mar. 17, 2001

Related U.S. Application Data
(60) Provisional application No. 60/274,593, filed on Mar. 10, 2001.

(51) Int. Cl.$^7$ ......................... G06F 15/177; G06F 9/455
(52) U.S. Cl. ............................... 713/100; 713/1; 713/2; 711/173
(58) Field of Search ............................... 713/1, 2, 100, 713/191, 155; 711/173, 6; 707/204

(56) References Cited

U.S. PATENT DOCUMENTS

| | | | |
|---|---|---|---|
| 5,675,769 A | * 10/1997 | Ruff et al. | 711/173 |
| 5,706,472 A | 1/1998 | Ruff et al. | 395/497.04 |
| 5,713,009 A | * 1/1998 | DeRosa et al. | 713/2 |

(Continued)

OTHER PUBLICATIONS

Brian K. Pearcy, "Re: .pst file in Outlook", Jul. 5, 1999, pp 1–2.*
Nagsteer, ".pst file in Outloop", Jul. 4, 1999, p. 1.*
Robert R. Marley, "Re: Ghost 2000–Partition ot Image operation Stalls", Jan. 26, 2001, p. 1.*
System Migration Assistant Version 2.1 User Guide, Mar. 2000.
"IBM Announces 'Tool kit' to Help Customers Easily Migrate to Windows 2000 Professional", Jul. 14, 2000.
System Migration Assistant (SMA) web pages; 3 pages; no later than Feb. 22, 2001.
Wired for Management web pages; 4 pages; no later than Feb. 23, 2001.
PowerQuest Partition Magician™ Newsletter, Jun. 1998.
PowerQuest Partition Magician™ Newsletter, Aug. 1997.
PowerQuest Partition Magician™ Newsletter, Nov. 1996.
PowerQuest Drive Image® Pro White Paper, 2000.
"Taking the Pain Out of Windows NT Profiles and System Policies with Novell's ZENWorks", Dec. 1999.
Introduction to IntelliMirror, Jan. 12, 2000.
System Migration White Paper, Jan. 8, 2001.
F. Rauch et al., "Partition Cast—Modeling and Optimizing the Distribution of Large Data Sets in PC Clusters", 2000.
F. Rauch et al., "Partition Repositories for Partition Cloning—OS Independent Software Maintenance in Large Clusters of PCs", 2000.

*Primary Examiner*—Chun Cao
(74) *Attorney, Agent, or Firm*—Workman Nydegger

(57) ABSTRACT

The invention provides tools and techniques for migration of user profiles in place on a computer. In one method, a first step provides a migration content storage partition to hold migration content such as user settings. This partition is provided by using a partition manipulation tool to obtain sufficient space on the computer. A second step saves migration content into the provided partition. A third step deploys an image into another partition on the computer, overwriting that partition. A fourth step then uses the migration tool to restore migration content from the migration content storage partition into the newly imaged partition, thereby customizing the new image with at least some of the former image's user settings. The migration content storage partition may then be deleted, or it may be retained and made available to the user as additional storage.

24 Claims, 9 Drawing Sheets

U.S. PATENT DOCUMENTS

| | | | | |
|---|---|---|---|---|
| 5,832,274 A | * | 11/1998 | Cutler et al. | 717/171 |
| 5,930,831 A | | 7/1999 | Marsh et al. | 711/173 |
| 5,964,873 A | * | 10/1999 | Choi | 713/2 |
| 5,974,567 A | * | 10/1999 | Dickson et al. | 714/27 |
| 6,108,697 A | | 8/2000 | Raymond et al. | 709/218 |
| 6,108,712 A | | 8/2000 | Hayes, Jr. | 709/246 |
| 6,108,759 A | | 8/2000 | Orcutt et al. | 711/173 |
| 6,161,176 A | * | 12/2000 | Hunter et al. | 713/1 |
| 6,167,494 A | * | 12/2000 | Cheston et al. | 711/162 |
| 6,182,212 B1 | | 1/2001 | Atkins et al. | 713/1 |
| 6,185,666 B1 | | 2/2001 | Murray et al. | 711/173 |
| 6,237,091 B1 | * | 5/2001 | Firooz et al. | 713/1 |
| 6,260,068 B1 | * | 7/2001 | Zalewski et al. | 709/226 |
| 6,330,653 B1 | * | 12/2001 | Murray et al. | 711/173 |
| 6,370,646 B1 | * | 4/2002 | Goodman et al. | 713/100 |
| 6,473,655 B1 | * | 10/2002 | Gould et al. | 700/5 |
| 6,473,840 B2 | * | 10/2002 | Matthews et al. | 711/154 |
| 6,539,480 B1 | * | 3/2003 | Drews | 713/191 |
| 6,560,706 B1 | * | 5/2003 | Carbajal et al. | 713/155 |
| 6,636,961 B1 | * | 10/2003 | Braun et al. | 713/1 |
| 6,658,435 B1 | * | 12/2003 | McCall | 707/204 |
| 6,681,325 B1 | * | 1/2004 | Marsh et al. | 713/2 |
| 6,728,877 B2 | * | 4/2004 | Mackin et al. | 713/100 |
| 6,795,835 B2 | * | 9/2004 | Ricart et al. | 707/204 |
| 2002/0042892 A1 | * | 4/2002 | Gold | 714/6 |

* cited by examiner

METHOD FOR DEPLOYING AN IMAGE INTO OTHER PARTITION ON A COMPUTER SYSTEM BY USING AN IMAGING TOOL AND COORDINATING MIGRATION OF USER PROFILE TO THE IMAGED COMPUTER SYSTEM

RELATED APPLICATIONS

This application claims priority to, and incorporates by reference, provisional application Ser. No. 60/274,593 filed Mar. 10, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. § 1.14. In particular and without limitation, copyright is claimed in the batch files shown herein.

FIELD OF THE INVENTION

The present invention relates to the migration of user customizations when changes are made in a computer's configuration, and relates more particularly to tools and techniques which coordinate the migration of user profiles with disk imaging to facilitate continued use of the profiles after operations such as an operating system upgrade, an operating system replacement, or a rollback to an earlier system image.

TECHNICAL BACKGROUND OF THE INVENTION

Users of individual computers often customize the more-or-less generic computer provided to them by a vendor. For instance, users may set various operating system and application program preferences, add new peripheral devices and corresponding drivers, load new application programs, create documents with application programs, select background bitmaps, and so on. Administrators who are responsible for multiple computers in a business, agency, institution, or other entity often make similar changes in order to customize those computers for particular users or groups of users.

Tools exist for migrating such user profile information to new machines, by copying them from the old machine to the new machine. These migration tools may also be used to copy user profile information over a network to a remote storage location when a network client is replaced or upgraded. After a new machine is installed, or a new image is installed on an existing machine to upgrade the client, the user profile information can be copied back over the network to the client and applied there to customize the client.

However, not every computer that needs a new image customized by old user profile information is attached to a network. Moreover, even if a network is available, substantial space may be required on network servers to simultaneously hold the user profiles of attached clients when all of those clients need to be modified by a new image that is then to be customized by their respective old user profile information. Of course, less space is needed if the clients are modified one-by-one, but much more time is then required than if multiple clients could be modified more or less concurrently.

Accordingly, there is a need for improved tools and techniques to coordinate the imaging of one or more computers with the migration of user profile information to the imaged computer(s). Such tools and techniques are described and claimed herein.

BRIEF SUMMARY OF THE INVENTION

The invention provides tools and techniques for coordinating imaging operations with user profile migration on a computer system. Some methods of the invention include four major steps discussed below; preparatory and/or supporting operations like those discussed and illustrated in the Detailed Description may also be performed as needed. In addition to its methods, the invention provides systems and configured computer-readable storage media that correspond generally to those methods.

A first step provides a migration content storage partition in the computer system; this partition will hold migration content such as user settings that are being migrated from an old operating system to an upgraded or new operating system on the computer. This partition is provided using a partition manipulation tool to manipulate one or more partitions of the computer system, by shrinking them to create more free space for the migration content storage partition, for instance. Partitions may also be moved, in order to consolidate scattered free space so it can be placed in the migration content storage partition. A partition large enough to hold the migration content can then be created using the consolidated free space, or an existing partition can be enlarged into the free space so it will be large enough to hold the migration content. One variation of the method deletes files from the computer system to make additional free space to hold migration content. An extended partition is used for migration content storage in some embodiments; in others, a logical or primary partition is used.

A second major step saves migration content (i.e., user profile information such as user settings and/or user data) into the provided migration content storage partition. This is accomplished using a migration tool, such as the IBM System Migration Assistant software.

A third major step deploys an image into a partition of the computer system, overwriting that partition's copy of user profile information that was first saved to the migration partition. The migration content storage partition is not overwritten during this imaging step, since that would destroy the migration content. Imaging is accomplished using an imaging tool, such as the PowerQuest Drive Image® Pro software. In some cases, rebooting the computer causes execution of a command that invokes the imaging tool.

A fourth major step then uses the migration tool to restore migration content from the migration content storage partition into the newly imaged partition, thereby customizing the new image with at least some of the former image's user settings. The migration content storage partition may then be deleted, or it may be retained and made available to the user as additional storage. The imaged partition may be resized, before or after the user profile information is restored; enlarging the imaged partition is especially desirable if more space for the imaged partition is available or if space for it can be made available by shrinking or deleting the migration content storage partition after the migration content stored there has been applied to the imaged partition.

The inventive migration code (which invokes the partition manipulation tool, invokes the migration tool, and invokes the imaging tool) may be implemented using batch files on Windows systems or other systems, or other scripts. It may also be partially or entirely implemented in EXE or other native executable code. Migration code may reside in various computer readable media even in a single given embodiment of the invention. Suitable locations for migration code include, for instance, files on a bootable CD, files in the new image on the computer's disk, and/or command files for network management tools. Some methods of the invention pass control from one part of the migration code to the next part by rebooting the computer, so that automatically executed batch files—which are run after a reboot—will invoke the next tool. In some cases, code that runs automatically when a CD is inserted can also be used, so that control is passed to migration code on the CD after the CD is inserted.

The boot image which receives control as the result of rebooting may be read from the CD, or read from a small partition on the computer's hard disk which is created for that purpose. The boot image may also be downloaded from a network server using PXE or similar technology. The boot image may also be read from a user file using the tools and techniques described in the commonly owned copending application by inventors Paul Madden et al. filed Feb. 17, 2001; one embodiment of these tools is in PowerQuest "virtual floppy" software (VIRTUAL FLOPPY is a mark of PowerQuest Corporation).

In short, the invention provides tools and techniques for coordinating image deployment with user profile migration by using partition manipulation tools and scripts or other software commands. The invention permits one to maintain user customization while deploying a new operating system, an operating system upgrade, or a rollback image that rolls the receiving partition back to an earlier state, for example. Other aspects and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

In describing embodiments of invention, the meaning of several important terms is clarified, so the claims must be read with careful attention to these clarifications. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file. In particular, an "embodiment" of the invention may be, without limitation, a system, an article of manufacture, a method, and/or a computer memory, CD, disk, or other digital or analog medium that is configured according to the invention.

Systems Generally

Figure 1:
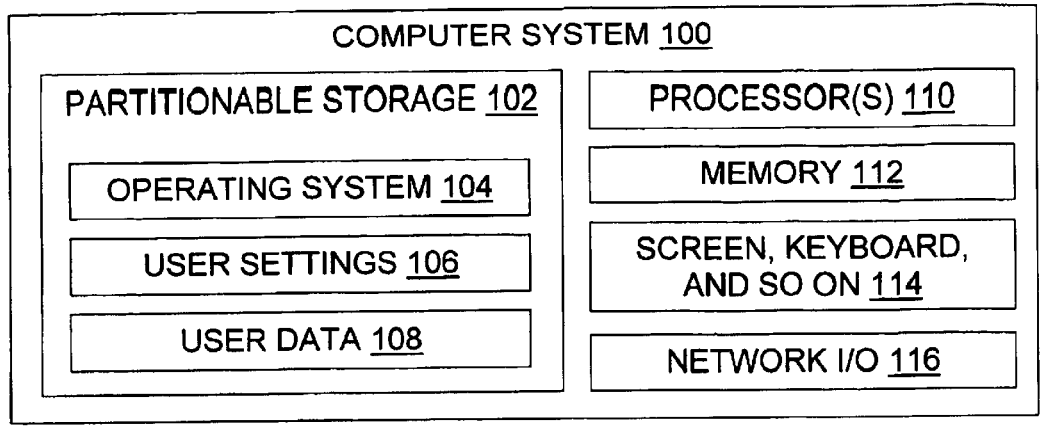
FIG. 1 is a schematic diagram illustrating components of a computer system which may be configured according to the invention.
Figure 6:
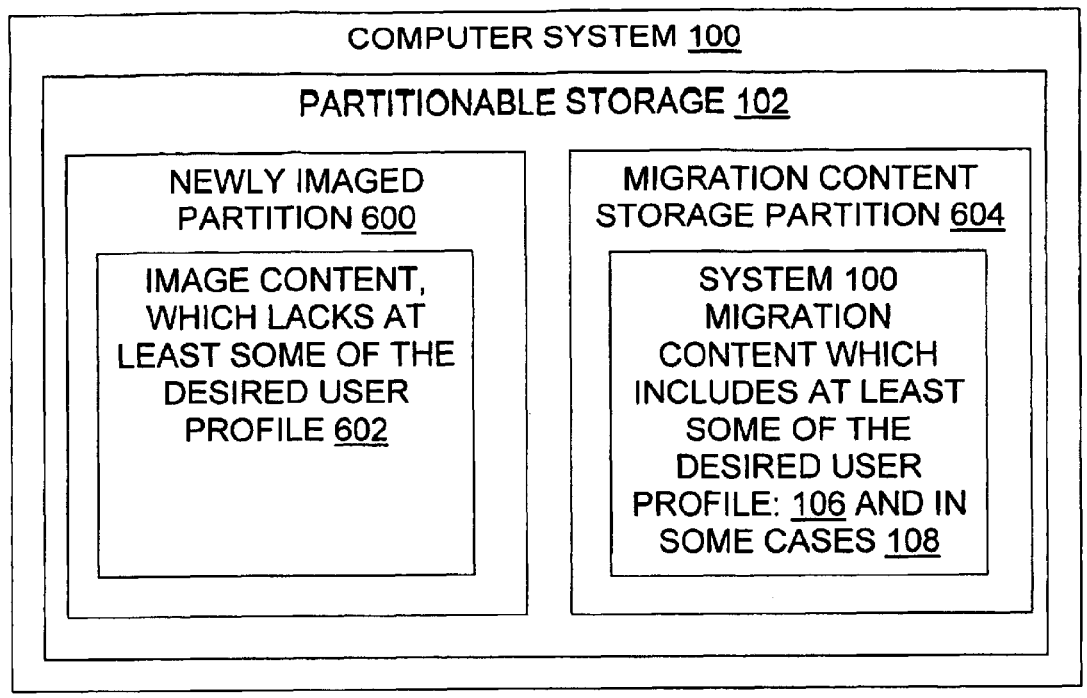
FIG. 6 is a schematic diagram illustrating components of the computer system at an intermediate point during the performance of a method of the invention.

FIG. 1 illustrates a computer system 100 which may be configured for use or otherwise utilized according to the invention; FIG. 6 shows part of the system 100 at an intermediate point during use of the system 100 according to methods of the invention. The computer system 100 may be a workstation, a laptop computer, a disconnectable mobile computer, a server, an embedded system, or a handheld computer, for instance. It may be a general purpose computer configurable by software, or it may be a special purpose machine configured by ASICs, FPGAs or the like. A processor 110 may be a uniprocessor or a multiprocessor component of the computer system 100. A suitable computer system 100 often includes one or more user I/O devices 114 such as a display screen, keyboard, mouse, microphone, speakers, touch screen, and so on.

The computer system 100 includes random access memory 112 and may include other forms of memory 112 such as ROM or PROM memory. The memory 112 is in operable communication with the processor 110, and the I/O devices likewise communicate with the processor 110 and/or the memory 112.

The computer system 100 is capable of using floppy drives, tape drives, optical drives or other means to read a storage medium. A suitable storage medium includes a magnetic, optical, or other computer-readable storage media having a specific physical substrate configuration. Suitable storage devices include floppy disks, hard disks, tape, CD-ROMs, DVDs, PROMs, RAM and other computer system storage devices. The substrate configuration represents data and instructions which cause the computer system 100 to operate in a specific and predefined manner as described herein. Thus, a given medium tangibly embodies a program, functions, and/or instructions that are executable by the computer system 100 to perform one or more steps for coordinating partition manipulations, imaging, and user profile migration substantially as described herein.

The computer system 100 includes a partitionable non-volatile storage medium 102 such as one or more magnetic or optical disks. The storage 102 may be internal, external, or a combination thereof. The partitionable storage 102 is divided, or divisible, into partitions by use of commercially available software such as the PartitionMagic® program (mark of PowerQuest Corporation), or the FDISK and FORMAT programs provided by operating system vendors such as Microsoft Corporation. Partition creation, partition and cluster resizing, file system optimization, and other partition manipulations are described in the following U.S. patents assigned to PowerQuest Corporation, which are incorporated herein by reference: U.S. Pat. Nos. 5,675,769; 5,706,472; 5,930,831; 6,088,778; 6,108,759; 6,178,487; 6,185,575; 6,185,666.

Within one or more partitions, the computer system 100 often includes an operating system 104, such as one of the Microsoft Corporation Windows operating systems and/or one of the operating systems in the UNIX family of operating systems. The computer system may be equipped with a boot management program that permits a user to select between two or more operating systems 104 that are installed on the computer system 100. Boot management is discussed in U.S. Pat. No. 6,178,503 assigned to PowerQuest Corporation and incorporated herein by reference. PowerQuest Corporation also provides BootMagic® boot management software with its PartitionMagic® program (marks of PowerQuest Corporation).

The computer system 100 can be customized by a user profile stored on the partitionable medium 102. Examples of user profiles may be found in documentation for migration tools. However, to the extent of any conflict, the implied and express definitions in this application take precedence over any definitions (of user profiles or other terms) provided elsewhere. In particular and without limitation, a "user profile" must include user settings 106, and may also include user data 108.

User settings 106 stored on the partitionable medium 102 customize the operating system 104 according to the particular hardware and/or software within the computer system 100, and/or according to the particular preferences of a given user. Various tools have been made available for capturing the user settings 106 of a given computer system 100, including without limitation Microsoft Windows registry-related files and software, Novell ZENWorks software, Microsoft IntelliMirror software, Miramar Systems Desktop DNA software, and IBM System Migration Assistant (SMA) software (marks of their respective owners).

User data 108 is often also stored on the partitionable medium 102 and it may often be copied or otherwise captured by the same migration tools (e.g., SMA software) that capture user settings 106. As used herein, "user data" is not necessarily limited to data created directly by a user, such as a particular spreadsheet or word processor document, but may also include user applications, such as spreadsheet and word processor programs. The act of capturing a user profile includes capturing user settings 106, and optionally includes capturing user data 108, so that it can be reproduced later.

The computer system 100 may be connectable to one or more networks through network I/O hardware and/or software 116. By way of example, suitable computer networks include local networks, wide area networks, and/or the Internet. "Internet" as used herein includes variations such as a private Internet, a secure Internet, a value-added network, a virtual private network, or an intranet. A network may include one or more LANs, wide-area networks, Internet servers and clients, intranet servers and clients, or a combination thereof. Such computer networks may form part of a telecommunications network and/or interface with a telecommunications network. The network's transmission media may include twisted pair, optical fiber cables, coaxial cable, telephone lines, satellites, radio waves, microwave relays, modulated AC power lines, and other data transmission "wires" known to those of skill in the art, as well as routers, bridges, caching appliances, and the like. Note that the term "wire" as used herein includes wired and/or wireless communications. Methods such as TDMA, CDMA, FDMA, and other encoding and/or multiplexing methods may be used, as well as GSM, PDC, Wireless Application Protocol, and other technologies and protocols. Signals according to the invention may be embodied in volatile and/or nonvolatile network transmission media.

The computer system 100 and other network components may be configured to operate according to network management approaches such as the Intel Wired for Management institutive, with software and hardware that operate according to the Preboot Execution Environment (PXE) specification, which makes it possible to configure or reconfigure the computer system 100 from a remote machine by dynamically downloading a boot image over a network to the computer system 100 even if the partitionable storage medium 102 initially contains no system or user data. The network may also be configured with IBM LanClient Control Manager (LCCM) software, which is an automated remote software distribution tool.

Although particular components are shown in the Figures and/or discussed herein, those of skill in the art will appreciate that the present invention also works with a variety of other networks and computers, as well as a variety of batch files, scripts, imaging tools, migration tools, and partition manipulation tools.

Methods

Figure 2:
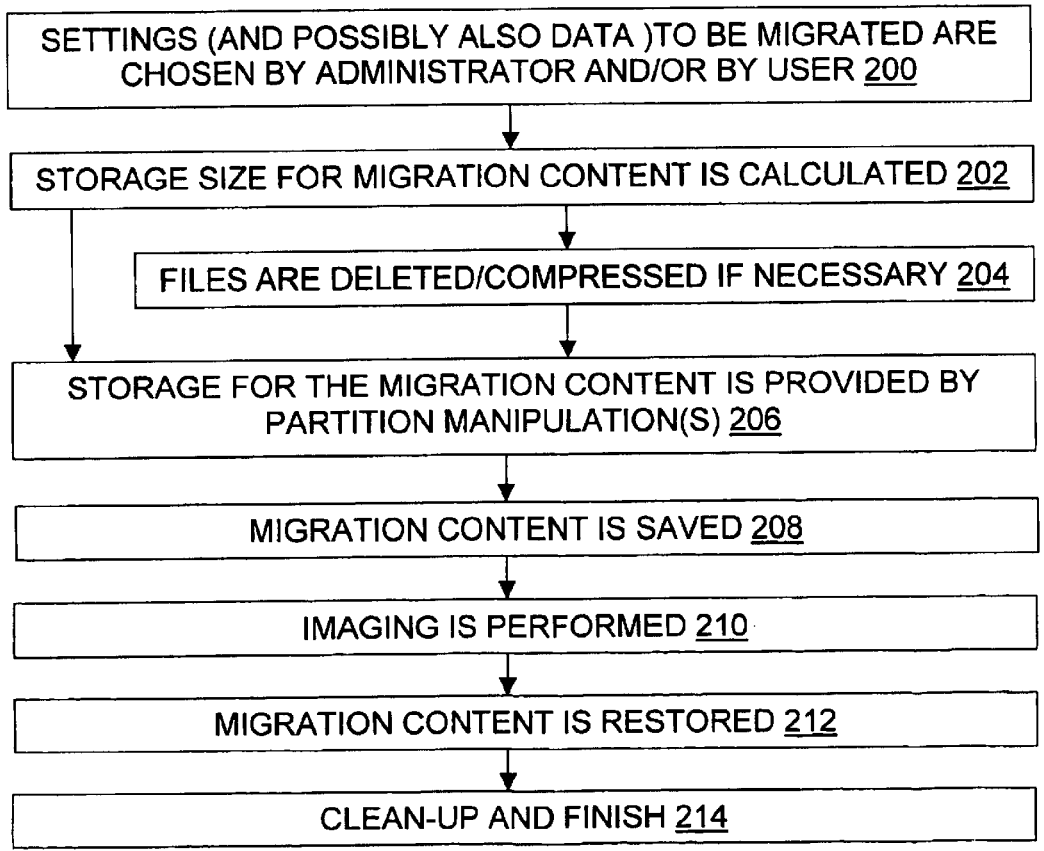
FIG. 2 is a flowchart illustrating methods of the present invention for coordinating migration and imaging operations in a manner which utilizes partition manipulations to facilitate in-place migration of specified user settings.
Figure 3:
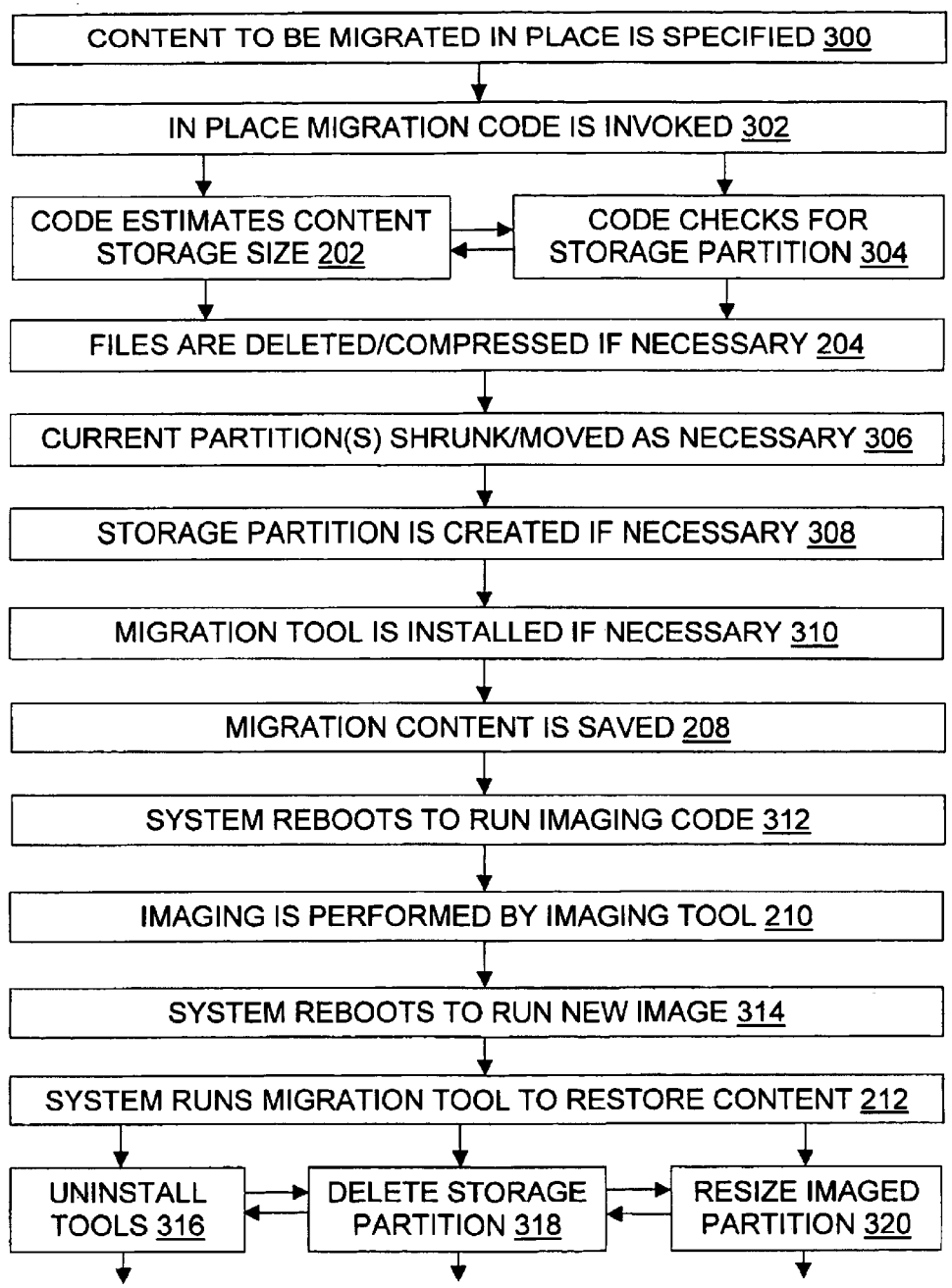
FIG. 3 is a flowchart illustrating in greater detail some of the methods depicted in FIG. 2.

FIGS. 2–5 illustrate methods of the present invention, beginning with a general overview in FIG. 2 and progressing through the more specific FIG. 3 to very specific methods for use with bootable CDs and with a PXE-bootable system 100, in FIGS. 4 and 5, respectively ("FIG. 4" means "FIGS. 4A through 4D", and "FIG. 5" means "FIGS. 5A through 5D"). To avoid repetition, it is assumed here that discussion of the computer system 100 will be applied by those of skill to promote understanding of the inventive methods, and vice versa. Likewise, the discussions of the inventive methods may be applied by those of skill to inventive computer storage media which are configured with software to operate according to the methods. Except as indicated otherwise, the discussion of a more general Figure also applies to a more specific Figure; discussions of specific Figures apply to more general Figures only to the extent needed to understand and use the general Figures.

Some of the depicted method steps may be performed in preparation for the inventive steps, and thus do not necessarily belong to the claimed method unless they are expressly claimed and/or deemed necessary by those of skill in the art. For instance, claims may refer to the use of a partition manipulation tool without expressly requiring that a license to the tool be obtained, since that requirement is understood in the art. The method steps may also be performed in a different order than that shown, or in an overlapping manner, except to the extent that one step requires the result of another step. Steps may also be repeated, named differently, and/or grouped differently in different embodiments.

In this context, FIG. 2 shows a method for coordinating user profile migration and storage medium imaging operations in a manner that utilizes partition manipulations to facilitate in-place migration of at least one or more specified user settings 106; user data 108 may also be migrated.

During a choosing step 200, a systems administrator and/or a particular user of the computer system 100 chooses the user settings 106 that are to be migrated in place. This choice may be aided by documentation which is provided with the migration tool (e.g., SMA software) to be used. Depending on the current content of the storage medium 102, the content of an image that will be loaded onto the medium 102 as described hereafter, and/or the desires of the user and/or administrator, the choosing step 200 may specify user data 108 to capture in addition to specifying user settings 106.

During a size estimating step 202, the estimated storage size needed to hold the migration content is calculated by the migration tool, input by the administrator, or otherwise obtained. The "migration content" includes the user settings 106 to be captured by the migration tool, any user data 108 to be captured by the migration tool, and any administrative overhead, such as space needed to hold the migration tool itself and optional extra space to reduce the risk that more space than the estimated amount will actually be required to hold the migration information.

If the amount of available space on the computer system's storage 100 is smaller than the estimated space required to hold the migration content, then a free space enlarging step 204 may be performed. The available space includes space within the medium 102's partition(s) which is not yet allocated to files or to file system structures, as well as space on the medium 102' disk(s) which lies outside currently defined partitions but could be placed in a resized or newly created partition. The amount of available free space may be increased 204 by automatically deleting temporary files, by having the user delete other files, and/or by compressing existing files, for instance. File deletion may be preceded by archiving or otherwise copying the file to another storage location before deleting it from the computer system 100.

During a partition manipulating step 206, storage space for the migration content is provided by operations that enlarge an existing partition (other than the one to be imaged), or create one that is large enough. Partition manipulations may be performed 206 by the PartitionMagic® program, for instance, under the control of a script or batch file and/or or under the direct control of the user or administrator. Depending on the embodiment used and the current configuration of the storage medium 102, suitable partition manipulations to create and consolidate free space may include optimizing a partition to recover space as discussed in U.S. Pat. No. 6,185,575; resizing clusters to recover space as discussed in patents such as U.S. Pat. No. 5,675,769, U.S. Pat. No. 5,706,472, and U.S. Pat. No. 6,108,759; shrinking partitions as discussed in the '769, '472, and other patents identified above; moving partitions to close gaps between them, as discussed in the '769, '472, and other patents identified above; and creating a new formatted partition or extending an existing partition to place the consolidated free space thus obtained within the scope of a file system so the space can be used to hold captured migration content in one or more files.

Although the partition provided by step 206 will often be expressly defined as a partition in the system's partition table, it may also be an "implicit partition", namely, space in the medium 102 which lies outside all expressly defined partitions and which has a beginning and end implicitly defined by one or more express partitions and/or disk edges. Expressly defined migration content partitions are preferred over implicit migration content partitions. Use of an implicit partition puts the migration content at significantly greater risk than an express partition, since processes running on the system will generally treat the implicit partition as free space even though it contains migration content. Also, if the migration content storage partition is to be made available to the user as additional storage space after the imaging and profile restoration steps described here, then the migration content storage partition will need to be expressly defined in the system's partition table anyway. Moreover, most or all commercially available migration tools will not recognize implicit partitions as destinations for migration content; the tools require a file in an expressly defined and formatted partition as a target.

Once sufficient space is available, the migration content is captured by SMA software or another migration tool and is saved 208 in the migration content storage partition provided by step 106. This proceeds generally in accordance with a normal use of the migration tool in other contexts.

Once the migration content is safely saved in the space provided for it on the computer system 100, a new image is loaded 210 into the storage medium. The imaging 210 may be done to deploy a new operating system on the computer 100, to upgrade an operating system 104 that is already installed on the computer 100, to roll back the state of the computer 100 to an earlier point in time for disaster recovery or testing purposes, or for other reasons. The imaging step 210 presumably overwrites at least some of the saved migration content in the partition it was saved 208 from, thereby providing the motivation for saving that migration content. Imaging 210 may be performed with software such as the Drive Image® or Drive Image® Pro software from PowerQuest Corporation (marks of PowerQuest Corporation) or other imaging software. Imaging may be performed using methods that include, without limitation, those described in U.S. Pat. No. 6,108,697 assigned to PowerQuest Corporation, and incorporated herein by this reference.

At this intermediate point in the inventive methods, the computer system 100 is configured in pertinent part as illustrated in FIG. 6. A newly imaged partition 600 in the computer's partitionable storage 102 includes the newly deployed operating system, the operating system upgrade, the rollback image, or the other image resulting from the image deployment step 210. The content 602 of the newly imaged partition 600 lacks at least some of the user profile information that was saved 208 before imaging. That missing user profile content, possibly with other user profile content, resides in the computer system 100 inside a migration content storage partition 604. The migration partition 604 was provided by step 206.

With further attention now to FIG. 2, during a user profile restoring step 212 the migration content is read back from its temporary storage location and applied to the newly image partition(s), thereby providing the user with a computer system 100 that is configured not only with the new image but also with the personal preferences, specific drivers, and other user profile information that makes the computer system 100 easier to use and/or more effective from the user's point of view. The step 212 proceeds generally in accordance with uses of the migration tool in other contexts, such as those in which partition manipulation 206 is not used to temporarily provide space on the system 100 for the migration content. Different executable programs may be used to save 208 and to restore 212 the user profile, provided those executable programs operate according to a shared specification; for instance, the IBM SMA tool includes a "srcbat" executable and a "tarbat" executable for saving and restoring profiles, respectively. For convenience, the user profile save and restore programs are referred to collectively as the "migration tool".

Finally, any necessary clean-up and finishing operations are performed 214. These are discussed in greater detail in connection with the succeeding Figures. They may generally include removing software such as the migration tool if it is no longer needed, removing partition manipulation software if it is no longer needed on the system 100, and either retuning the migration content's temporary storage space to the other partitions or making it available for use by the user in a new partition from which the migration content has been deleted.

Methods Using Computer Reboots

FIG. 3 illustrates in greater detail some of the methods shown in FIG. 2. In particular, during a step 300 the content to be migrated may be specified in an input file to a migration tool, as an instance of the choosing step 200. The format of the file depends on the migration tool, and will normally be described in the migration tool's documentation.

A step 302 invokes "in place migration" code such as a script or batch file, which then automates many or all of the remaining steps of the illustrated method. Particular invocation means and batch files are discussed in connection with FIGS. 4 and 5.

To help provide 206 storage for migration content, the "in place migration" code checks the storage medium 102 to determine whether a partition is already present there which can be used (perhaps after being enlarged) to hold the migration content. As indicated expressly in FIG. 3, the code may first calculate 202 the amount of storage needed and then check for a partition of that size (or a partition expandable to that size). Alternately, the code may first check for a partition, calculate the storage needed, and then check to see if the partition can be expanded. Steps of inventive methods may be omitted, performed in different orders than those shown, regrouped, repeated, and/or renamed, even when that is not expressly indicated in a Figure.

Once files have been deleted and/or compressed as needed (and as permitted) 204, and once existing partitions have been shrunk and/or moved as necessary 306 to obtain and consolidate in one location the necessary amount of space for migration content storage, the migration storage partition is created 308 or expanded to include that space. Note that the file deletions performed during step 204 (if that step is taken) may include deleting files in the partition that will be imaged, if those files are being replaced by files in the new image or are not needed after imaging. Likewise, partition manipulations performed during step 306 may include shrinking the partition that will receive the new image.

If a new partition was created 308 to hold the migration content, that partition is formatted as required by the migration tool. If an existing partition was enlarged to cover the migration content storage space, that partition's file system is enlarged accordingly.

If the migration tool runs more effectively from the computer system 100 than remotely, it can be installed 310 on the computer system 100 in the migration storage partition. Installation 310 of the migration tool involves typical file copy, registry update, and similar operations, generally in accordance with use of the migration tool in contexts other than use according to the present invention.

Methods illustrated by FIG. 3 take advantage of tools such as run-once registry keys, batch files that are automatically executed on booting, and similar mechanisms, to pass control from one piece of "in place migration" code to the next. Specific examples are discussed in connection with FIGS. 4 and 5; rebooting steps are shown generally as steps 312, 314 in FIG. 3. Rebooting step 312 may include an automatic reboot or the reboot may be initiated by the user in response to a prompt from the "in place migration" code; when the system 100 reboots 312, an imaging script or batch file runs 210 to invoke Drive Image® Pro software or another imaging tool. Rebooting step 314 may likewise include an automatic reboot or a user-initiated reboot; when the system 100 reboots 314, a profile restoring script or batch file runs to invoke SMA software or another migration tool to restore 212 the saved user profile back into the newly imaged partition(s).

Steps 316–320 further illustrate the cleanup step 214. As indicated expressly in the Figure, one or more of these steps may be performed in a given instance of step 214, and the steps may be performed in various orders. During an uninstalling step 316, tools such as the migration tool, partition manipulation tool, imaging tool, and/or "in place migration" scripts or batch files may be deleted from the computer 100. This may be done to provide additional free space, to prevent inadvertent damage from their improper use, and/or to comply with license restrictions, for instance. During a migration storage partition deleting step 318, the migration storage partition is deleted. During an imaged partition resizing step 320, the newly imaged partition is enlarged to include some or all of the free space that was obtained by the partition manipulations during step 306.

Methods Using a Bootable CD

FIGS. 4A through 4D illustrate methods of the invention which use a bootable CD. It will be appreciated that a bootable Iomega Zip disk, bootable DVD disk, or other bootable removable storage medium may be used in equivalent methods of the present invention. In addition, in place of a bootable CD the invention may use the "virtual floppy" tools and techniques for running pre-boot code which are described in commonly owned copending application by inventors Paul Madden et al. filed Feb. 17, 2001, and incorporated herein.

Figure 4A:
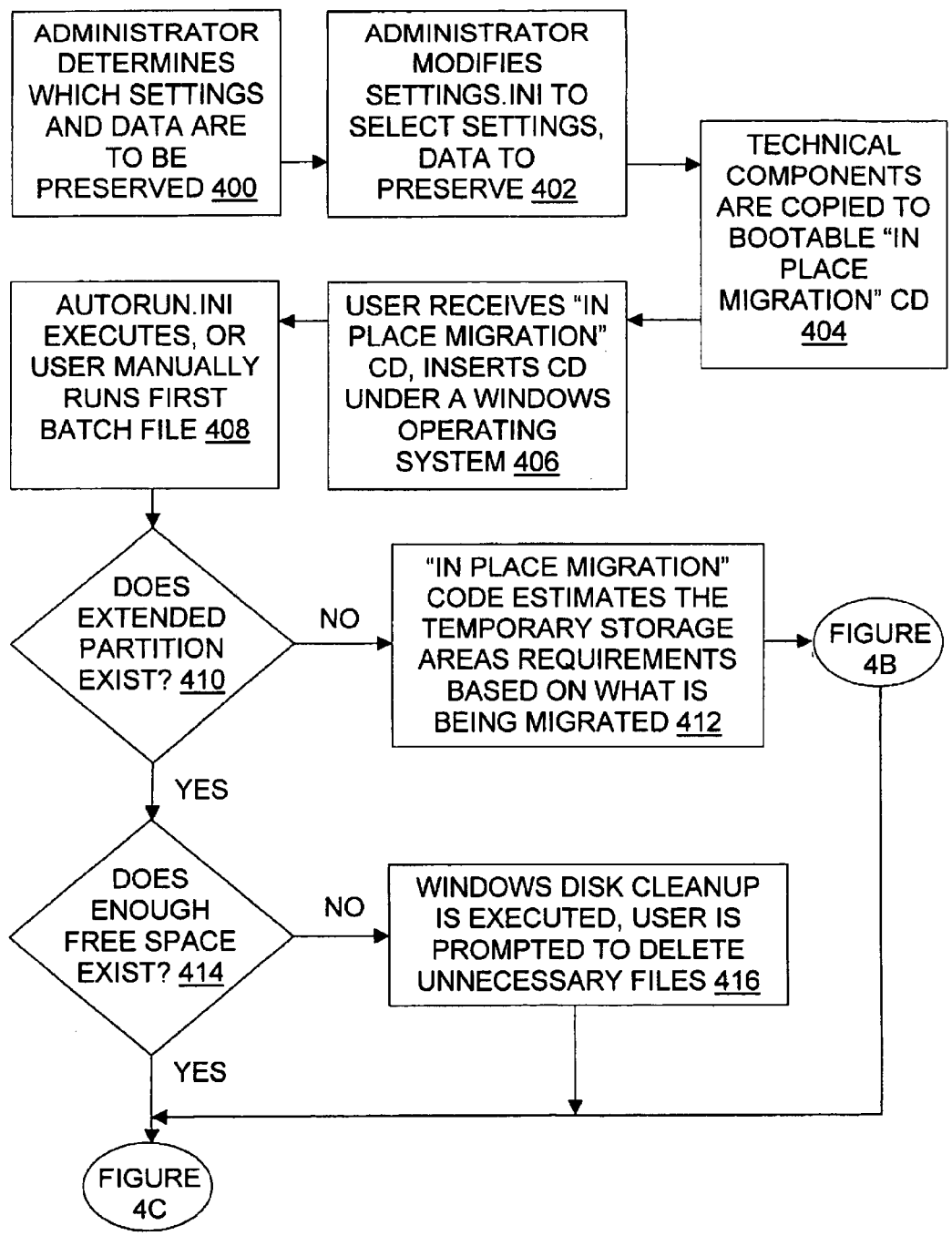
FIGS. 4A through 4D collectively show a flowchart illustrating methods of the invention for coordinating migration and imaging operations on a computer system using a bootable CD.

During a step 400 shown in FIG. 4A, an administrator determines which user settings 106 and user data 108 will be preserved by the migration. The administrator accordingly modifies 402 a SETTINGS.INI file which specifies the user profile to the SMA migration tool. Other migration tools may also be used in a similar manner. Steps 400 and 402 are thus instances of step 300, which is itself and instance of step 200.

Various technical components are copied to a bootable "in place migration" CD during a step 404. This CD has also been referred to by PowerQuest in presentations made to IBM as a "clean start" CD. In one embodiment, the technical components on the CD included PowerQuest PartitionMagic® Pro software (for partition resizing), PowerQuest "virtual floppy" software (for a booting environment), PowerQuest Drive Image® Pro software (for partition/disk imaging), and IBM SMA software (as the migration tool).

During a step 406, the computer 100 user receives the "in place migration" CD, and places it in the computer 100, which is assumed in this embodiment to be running or runnable under a Microsoft Windows operating system. During a step 408, the AUTORUN.INI file on the CD runs automatically; on computers 100 which do not have CD autorun capability enabled, the user manually runs a first batch file. In one embodiment, the AUTORUN.INI file (or the corresponding manually invoked batch file) contains the following commands:

[autorun]
open=clnstart.bat

Figure 4B:
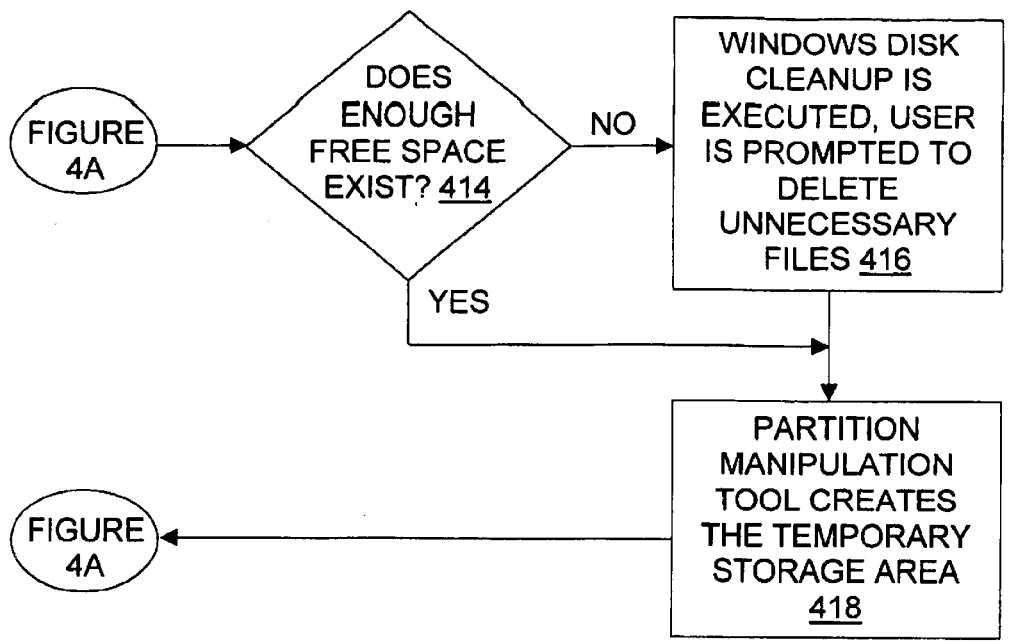

As a result, the migration code determines 410 whether an extended partition exists on the computer's partitionable storage medium 102. In this embodiment, an extended partition is preferably used as the migration storage partition; in other embodiments, other partition types may be used. If an extended partition is not found, then the migration code estimates 412, 202 the size of the extended partition based on the amount of user profile information to be saved 208 and restored 212. As shown in FIG. 4B, if enough free space exists 414, then partition manipulations are performed 206, including creation of an extended partition. If enough free space is not yet available, then files are deleted 416, 204 to obtain the necessary space to allow creation 418 of the extended partition which will hold the user profile captured by the migration tool.

Returning to FIG. 4A, if the test 410 determines that an extended partition already exists, then the migration code checks 414 to see whether enough free space exists in that extended partition to hold the captured user profile. If not, then files are deleted 416, 204 to obtain the necessary space. Note that although tests 410 and 414 are illustrated as occurring in that order, in another embodiment a test for total free space on the medium 102 could precede a test for the existence of an extended partition, with corresponding changes that will be apparent to one of skill.

Figure 4D:
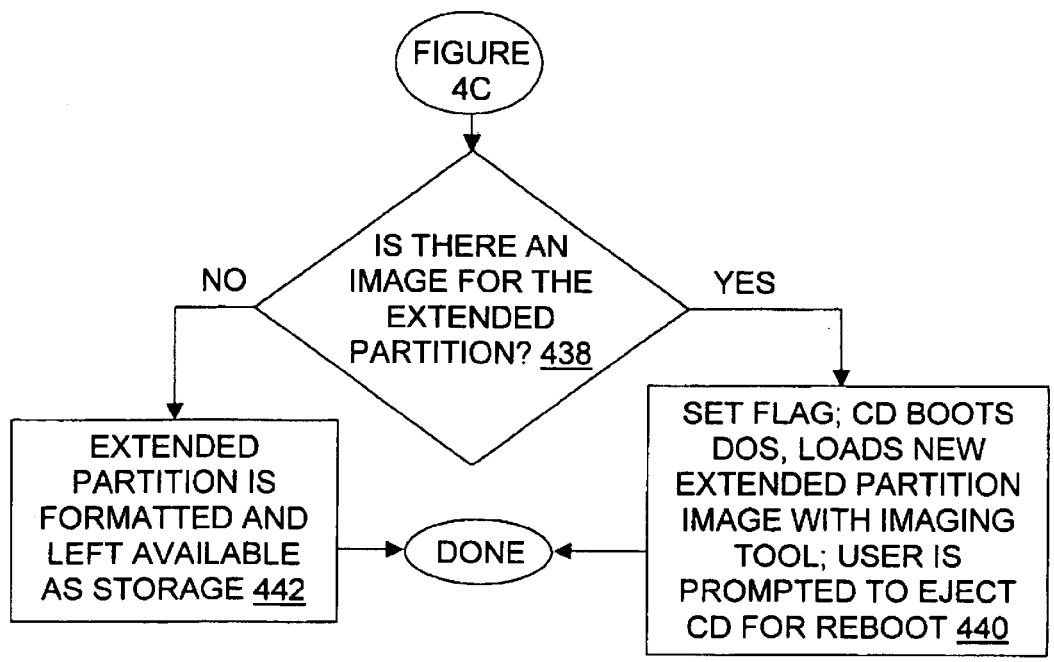
Figure 4C:
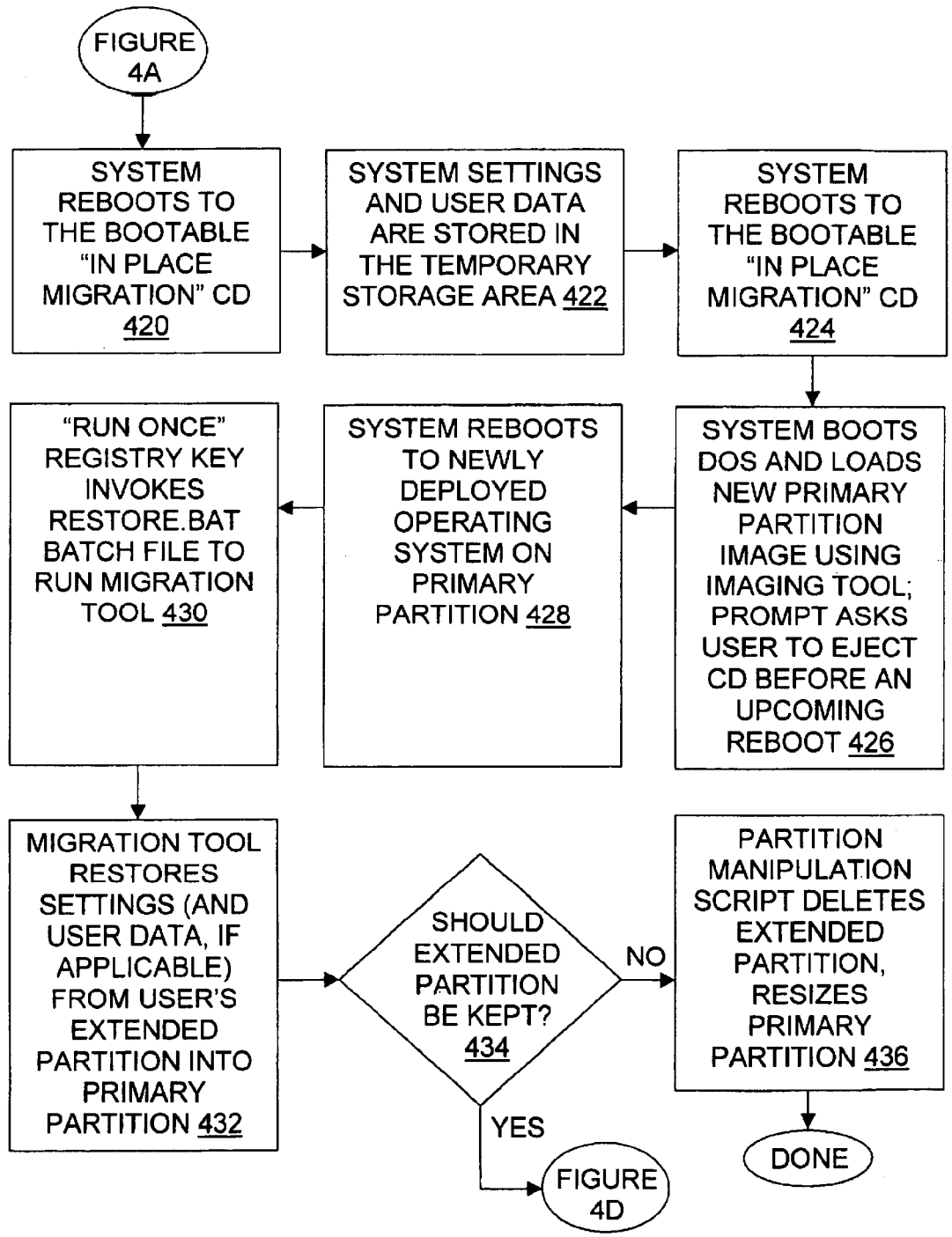

Moving now to FIG. 4C, the system 100 reboots to the bootable "in place migration" CD. Some embodiments use PowerQuest PQBoot software, while others use PowerQuest Virtual FLOPPY™ Installer software (VFInst9X, VFInstNT, etc.); either permits an automatic reboot. The SMA migration tool (or another migration tool) is then invoked by the "in place migration" code, causing user profile data to be captured and saved in the extended partition during a step 422, which is an instance of step 208. The system reboots 424 once again to the bootable "in place migration" CD; this is preferably an automatic reboot. This boots the system 100 under a DOS operating system and invokes 426 Drive Image® Pro software or another imaging tool to load the new image onto the system's primary partition. A prompt from the "in place migration" code also asks 426 the user to eject the bootable CD from the computer 100's CD drive before an upcoming reboot.

The system 100 then reboots 428; since the CD was ejected, the system 100 boots from the newly deployed operating system 104, that is, the operating system that was loaded into the system's primary partition by the imaging 426 operation. In that image, a "run once" Windows registry key setting (or similar mechanism in other operating systems) invokes 430 a batch file named RESTORE.BAT; other batch file names, or scripts, can be used in other embodiments. As a result, the migration tool restores 432, 212 the captured user profile from the extended partition and applies it to the newly imaged primary partition.

The remainder of FIG. 4C, and all of FIG. 4D, illustrate an instance of the clean-up and finish step 214. A test is made 434 to determine whether the user and/or administrator have indicated that the system 100 should contain an extended partition once the imaging is done and the user profile is restored. This may be accomplished using an .INI or script file, for instance, to select this feature (and possibly other features). If the test 434 indicates that no extended partition is desired, then a PartitionMagic® script or similar mechanism is used 436 to delete the extended partition, and optionally to resize the primary partition so that it contains at least some of the space formerly occupied by the extended partition.

If the test 434 indicates that the extended partition should be kept, then a different test is performed 438 (as shown in FIG. 4D) to determine whether the extended partition should itself receive an image. If so, a flag is set 440. The flag may be an entry in a configuration file (.INI or script) or an embodiment may check for the existence of a certain file to determine what should be done. The bootable CD is booted to DOS again, the imaging tool is used to image the extended partition, and the user is prompted to reboot after ejecting the CD. If the extended partition is to be kept but not imaged, then it is simply left available 442 to the user as additional formatted storage space in the medium 102.

Methods Using a Network Boot Image

FIGS. 5A through 5D illustrate methods of the invention which use a network boot image, such as a boot image that is downloaded to the computer 100 according to the PXE specification. These methods use many of the steps and operations discussed above in connection with the earlier Figures. To avoid unnecessary repetition, the discussion in this section therefore focuses on steps that are different from the earlier methods' steps in some respect.

In particular, step 500 places the technical components of the "in place migration" code in a location accessible through the network I/O 116, rather than placing 404 them on a bootable CD. A network server drive may be used, or a Storage Area Network, for example. The "in place migration" code is invoked 502 by the IBM LCCM product, or by another familiar network management tool, rather than being invoked 408 by the CD AUTORUN.INI file, for instance.

The bootable CD methods shown in FIGS. 4A to 4D may run the migration tool off the CD, or they may install it in the computer 100's extended partition and run it from there. As shown in FIG. 5C, the network boot methods preferably install 504 the migration tool in the computer 100's extended partition and run it from there. This is preferred, as one cannot always guarantee network connectivity due to possible client/driver configuration changes after deploying the new image.

Figure 5A:
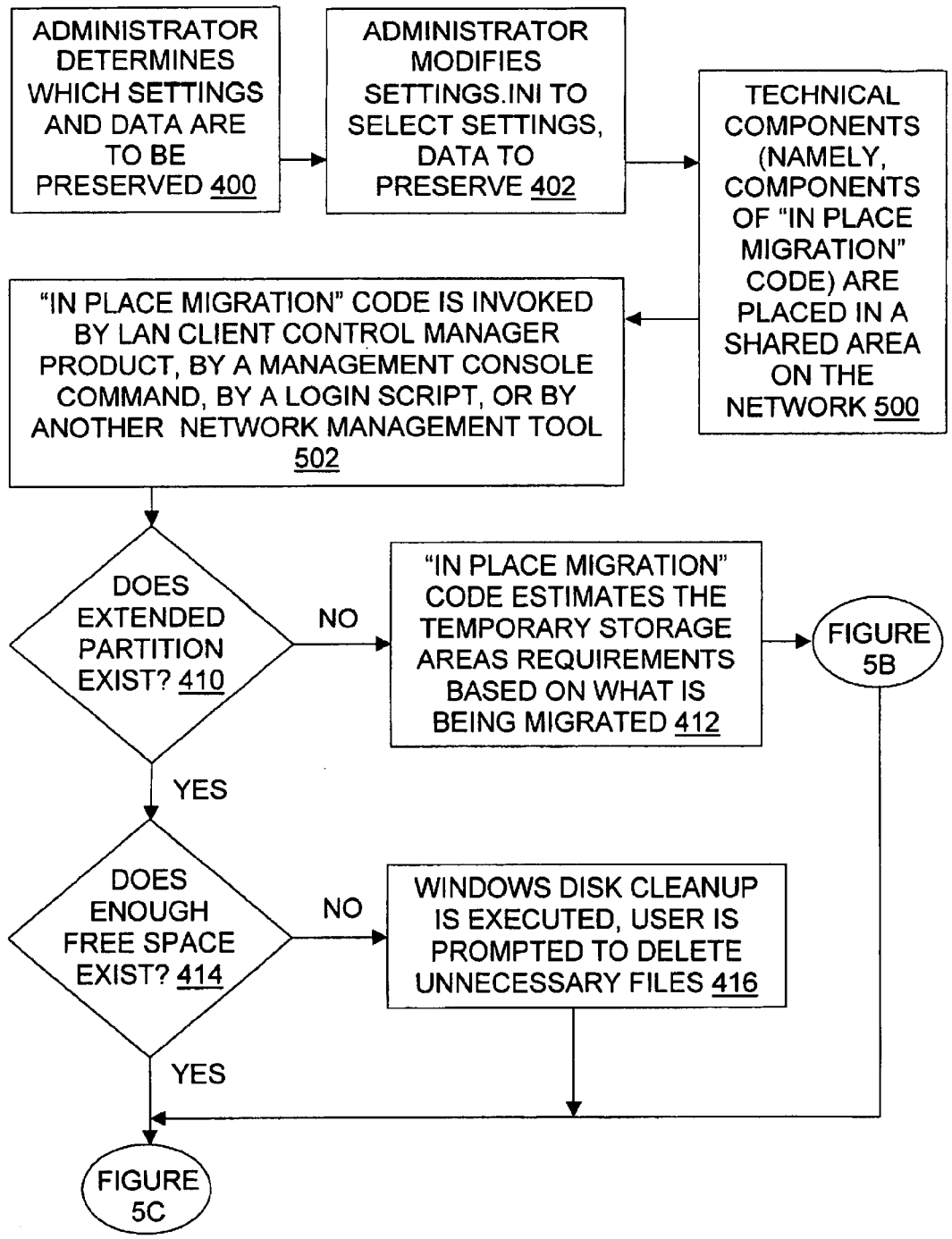
FIGS. 5A through 5D collectively show a flowchart illustrating methods of the invention for coordinating migration and imaging operations on a computer system which boots using an image downloaded through a network connection.
Figure 5B:
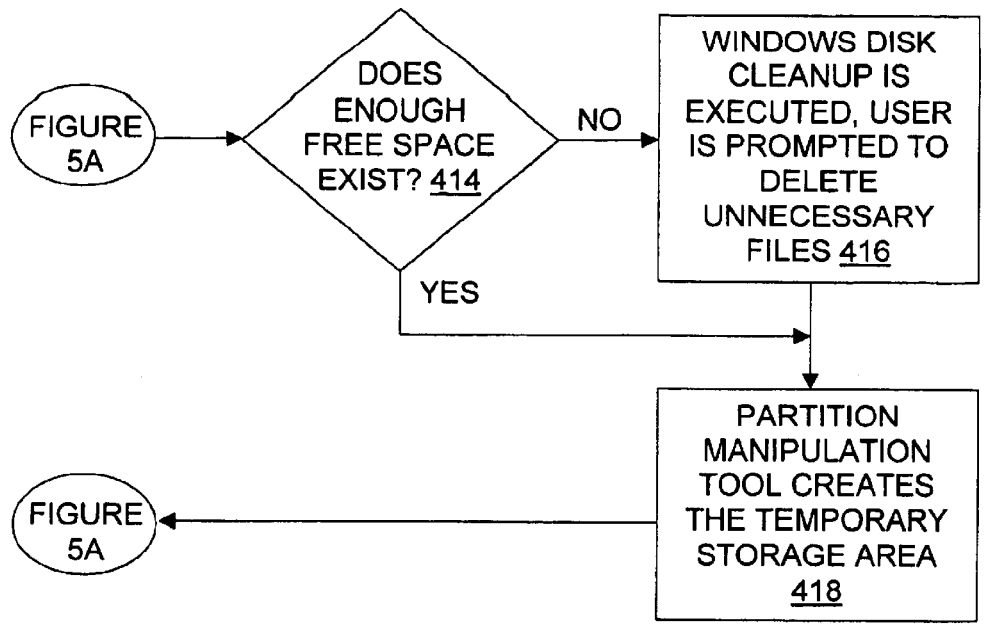

As indicated by step 506, the migration tool may capture user profile information not only from the primary partition but also from the extended partition, when it existed prior to step 410 of FIG. 5A. If the extended partition is imaged during step 514, the captured user profile information for it can be saved outside it and then restored to it. The captured user profile information for the extended partition could be saved to a network, or to the primary partition, for example.

As indicated by step 508, the "in place migration" code can verify 508 that the capture files produced by the migration tool actually exist in the extended partition before rebooting. This is preferably done to ensure that the capture completed successfully before overwriting with a new image. If the capture failed but the image is deployed anyway, the user's data/settings are gone.

During step 510, the system 100 reboots using a network boot image, such as an image downloaded to the system 100 over the network using PXE components. The PXE boot image boots 512 DOS on the system 100 and loads a new image to the system's primary partition using an imaging tool.

Figure 5D:
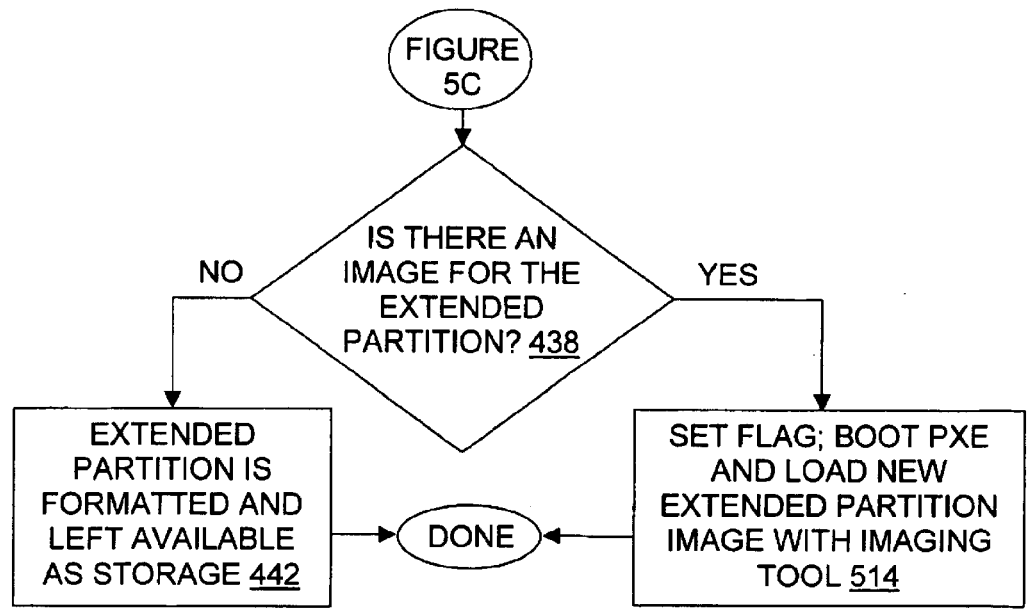
Figure 5C:
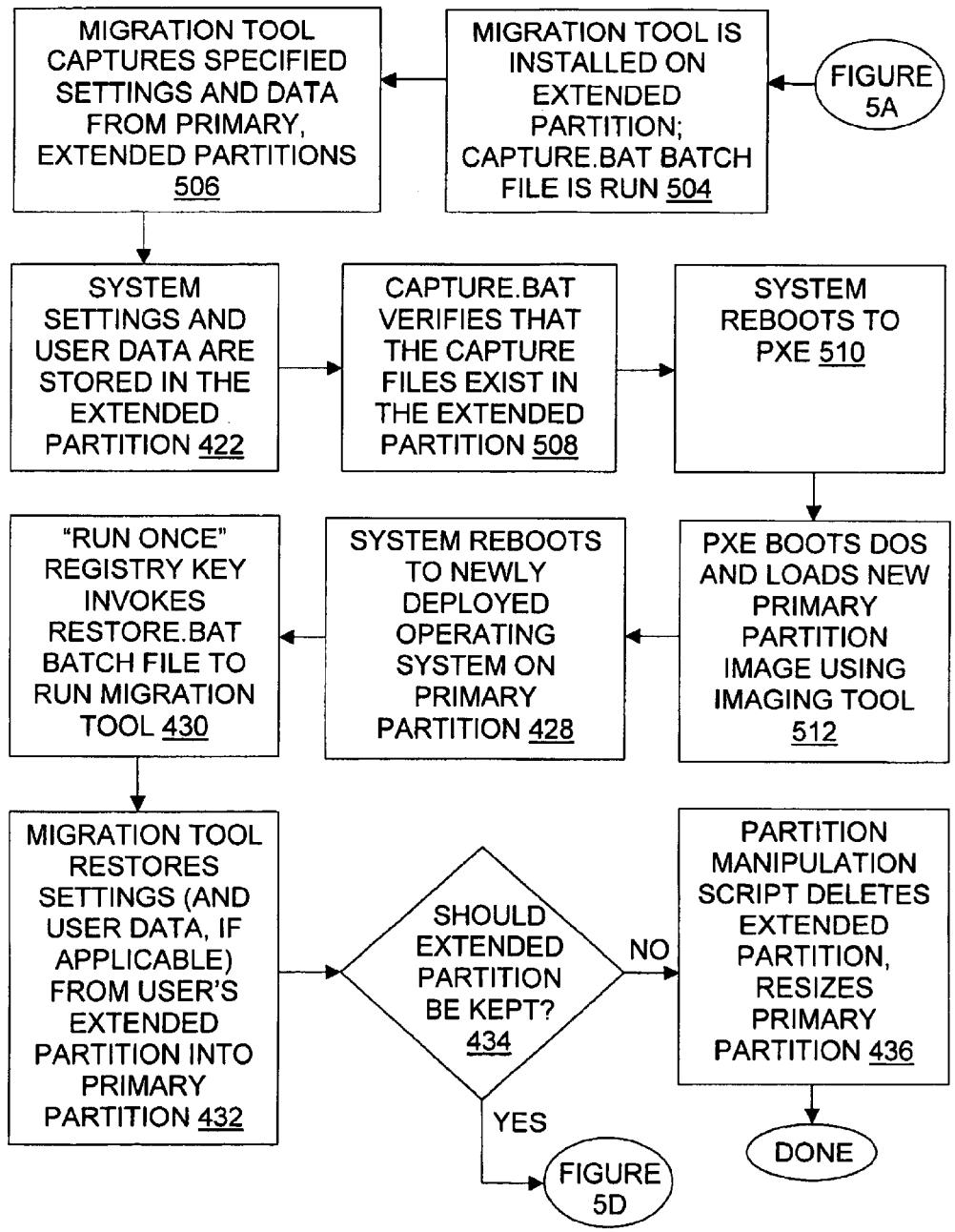

Moving to FIG. 5D, if the system 100 is meant to have an extended partition after the primary partition is imaged and has its user profile restored, and if an image is available over the network for that extended partition, then the system is rebooted from PXE, and a new image is written 514 to the extended partition.

ADDITIONAL EXAMPLES AND DETAILS

In one embodiment, the capture 208 is accomplished using a batch file named CAPTURE.BAT, which contains the following commands:

```
@echo off
cls
d:
cd\delltest\sma
echo.
echo.
echo Capturing PC personality using IBM SMA
echo.
srcbat /c dell7500.txt /o d:\delltest
echo.
echo Personality capture complete.
echo.
```

```
echo Booting to PQP . . .
echo.
cd\
pqboot32 /p:1
```

In this CAPTURE.BAT file, the migration tool invoked is a version of the IBM SMA program; the "srcbat" command invokes SMA code to capture 208 user profile information using SMA commands specified in the file DELL7500.TXT and to save 208 the output to the directory D:\DELLTEST. In other embodiments, other file names could be used for the user profile specification, and other partitions and directories could be used to receive the captured migration content.

The pqboot32 command line in this CAPTURE.BAT file causes the computer 100 to reboot 312 to a partition labeled PQP. The PQP partition is a small partition at the beginning of the partitionable storage medium 102. The PQP partition plays a role similar to that played by a bootable CD as discussed in connection with FIGS. 4A to 4D; in place of the PQP partition, the invention could use a bootable CD, "virtual floppy" mechanism, or other means for running an imaging tool.

In this embodiment, an AUTOEXEC.BAT file in the PQP partition runs after the computer 100 is booted from the PQP partition. The AUTOEXEC.BAT file invokes 210 the imaging tool (e.g., by calling the PowerQuest Drive Image® program through a "pqdi" command), and reboots to the new image (e.g., by calling PowerQuest boot management software through a "pqboot" command). The newly deployed operating system runs Microsoft SYSPREP tool to create a new security ID (SID). SIDs are part of a copy authentication process which discourages unauthorized copying of Microsoft operating systems. In one embodiment, a SYSPREP.INF file in the deployed primary partition contains the following content; note in particular the "run once" registry entry which will cause invocation of the SMA migration tool to restore 212 the user profile after imaging 210:

```
;SetupMgrTag
[Unattended]
    OemSkipEula=Yes
    InstallFilesPath=C:\sysprep\i386
[OEM_Ads]
    Background=swirl.bmp
[GuiUnattended]
    AdminPassword=*
    AutoLogon=Yes
    AutoLogonCount=1
    OEMSkipRegional=1
    TimeZone=20
    OemSkipWelcome=1
[UserData]
    FullName="Chuck Peters"
    OrgName=PowerQuest
    ComputerName=dell2
    ProductID=P3CVH-P2WH3-VCQ6Y-XJDGG-6V93B
[SetupMgr]
    DistFolder=C:\sysprep\i386
    DistShare=win2000dist
[GuiRunOnce]
    Command0=D:\DELLTEST\SMA\RESTORE.BAT
[Identification]
    JoinWorkgroup=WORKGROUP
[Networking]
    InstallDefaultComponents=Yes
```

In one embodiment, the AUTOEXEC.BAT file in the PQP partition contains the content shown below. Those of skill will appreciate that other batch files, scripts, or the like may be used in other embodiments to perform the desired imaging 210 and to pass control of the processor 110 to or toward other migration code to restore 212 the user profiles once imaging 210 is finished.

```
@ECHO OFF
CLS
PATH=C:\DOS;C:\PQ;C:\
IF "% config %"=="CURRENT" GOTO CURRENT
IF "% config %"=="WIN2K" GOTO WIN2K
IF "% config %"=="NETWARE" GOTO NETWARE
IF "% config %"=="NT4SRVR" GOTO NT4SRVR
IF "% config %"=="WIN2KSRVR" GOTO WIN2KSRVR
IF "% config %"=="PQPDOS" GOTO PQPDOS
goto END
:CURRENT
d:
cd\
cls
echo Applying Current Windows 98 Image . . .
pqdi /dsk=1/cmd=script.txt /ipe /ifc /img=d:\current.pqi /nrb
cls
echo Image Restoration Successful! Restarting . . .
echo.
pqboot /p:2
goto end
:WIN2K
If exist d:\delltest\dell7500.sma goto image_w2k
If not exist d:\delltest\dell7500.sma goto current
goto end
:image_w2k
d:
cd\
cls
echo Applying Windows 2000 Professional Image . . .
pqdi /dsk=1/cmd=script.txt /ipe /ifc /img=d:\win2k.pqi /nrb
cls
echo Image Restoration Successful! Restarting . . .
echo.
pqboot /p:2
goto end
:NETWARE
d:
    cd\
cls
echo Applying Netware 5 Server Image . . .
pqdi /dsk=1/cmd=script.txt /ipe /ifc /img=d:\netware.pqi /nrb
cls
echo Image Restoration Successful! Restarting . . .
echo.
pqboot /p:2
goto end
:NT4SRVR
d:
cd\
cls
echo Applying Windows NT 4 Server Image . . .
pqdi /dsk=1/cmd=script.txt /ipe /ifc /img=d:\NT4SRV.pqi /nrb
cls
echo Image Restoration Successful! Restarting . . .
echo.
pqboot /p:2
goto end
:WIN2KSRVR
d:
cd\
cls
```

```
echo Applying Windows 2000 Server Image . . .
pqdi /dsk=1/cmd=script.txt /ipe /ifc /img=d:\win2ksrv.pqi
/nrb
cls
echo Image Restoration Successful! Restarting . . .
echo.
pqboot /p:2
goto end
:PQPDOS
MSCDEX /D:cd01 /L:F
goto end
end
```

In one embodiment, the SCRIPT.TXT file includes:

```
SELECT DRIVE 1
SELECT PARTITION FIRST
DELETE
SELECT FREESPACE FIRST
SELECT IMAGE ALL
RESTORE
```

The new image has a "run once" flag set in its Microsoft Windows registry, which invokes a RESTORE.BAT batch file. In one embodiment, the RESTORE.BAT batch file contains the following:

```
@echo off
d:
cd\delltest\sma
cls
echo.
echo.
echo Restoring PC personality using IBM SMA
echo.
tarbat /f d:\delltest\dell7500.sma /c restore.txt
echo.
echo Personality restore complete.
```

In one embodiment, the computer 100 has a CONFIG.SYS file containing the following content, but it will be appreciated that the invention can also be used on computers 100 with many other configurations:

```
[menu]
menuitem=CURRENT, Restore Current System Configuration.
menuitem=WIN2K, Restore Windows 2000 Workstation Image.
menuitem=NETWARE, Restore Netware 5 Server Configuration.
menuitem=NT4SRVR, Restore Windows NT 4 Server Configuration.
menuitem=WIN2KSRVR, Restore Windows 2000 Server Configuration.
menuitem=PQPDOS, Boot DOS in PowerQuest Partition Only.
menudefault=WIN2K,15
menucolor=7,0
[CURRENT]
DEVICE=C:\DOS\HIMEM.SYS
DEVICE=C:\DOS\OAKCDROM.SYS /D:CD01
[WIN2K]
DEVICE=C:\DOS\HIMEM.SYS
DEVICE=C:\DOS\OAKCDROM.SYS /D:CD01
[WIN2K]
DEVICE=C:\DOS\HIMEM.SYS
DEVICE=C:\DOS\OAKCDROM.SYS /D:CD01
[NETWARE]
DEVICE=C:\DOS\HIMEM.SYS
DEVICE=C:\DOS\OAKCDROM.SYS /D:CD01
[NT4SRVR]
DEVICE=C:\DOS\HIMEM.SYS
DEVICE=C:\DOS\OAKCDROM.SYS /D:CD01
[WIN2KSRVR]
DEVICE=C:\DOS\HIMEM.SYS
DEVICE=C:\DOS\OAKCDROM.SYS /D:CD01
[PQPDOS]
DEVICE=C:\DOS\HIMEM.SYS
DEVICE=C:\DOS\OAKCDROM.SYS /D:CD01
[COMMON]
```

Bootable CD Example

In one embodiment, a bootable CD according to the invention contains an image to be placed 210 in the partition 600 being imaged, plus the following files as technical components:

CLNSTART.BAT

Batch file in c:windows/desktop/temp which launches the in-place migration process; includes content such as:

```
rem Clean Start Migration Process Initiation
rem
rem This process starts the SMA Detection to determine
rem disk space required for migration output and then
rem passes the required size to PartitionMagic to create
rem the Extended Partition.
rem
rem For purposes of this demo, detection is not required
rem and we will jump straight to partition creation.
rem
rem This section pushes down the Virtual Floppy which will
rem boot the DOS environment for partition creation and
    imaging.
rem Check for Extended Partition
rem if exist D:\NUL goto migrate
@echo off
:Detect
rem Insert Detection Process here
:Create_Storage
rem Virtual Floppy launched to create Extended Partition
cls
echo.
echo.
echo Starting Virtual Floppy . . .
echo.
copy D:\pqmagic\vf*.* c:\
copy D:\pqmagic\*.vfd c:\
copy D:\pqmagic\restrmbr.* c:\
c:
cd\
vfinst9x
goto end
:Migrate
rem Copy SMA Files to D:\clnstart
d:
cd\
md clnstart
cd clnstart
copy g:\sma\*.*
rem Launch SMA to Migrate Personality to Extended Partition
cls
echo.
echo.
echo Capturing PC personality using IBM SMA
echo.
srcbat /c source.txt /o d:\clnstart
echo.
```

```
echo Personality capture complete.
echo.
echo Booting to Virtual Floppy . . .
:end
AUTORUN.INF
Runs the clnstart.bat automatically when the CD is inserted:
[autorun]
open=clnstart.bat
Directory of C:\WINDOWS\Desktop\temp\DIPro4
MOUSE.COM
Mouse driver
MOUSE.INI
Mouse driver config file
PQDI.EXE
Drive Image® Pro main executable
PQDI.OVL
Drive Image® Pro overlay file
PQDI.PQG
Drive Image® Pro associate file
PQDI.RTC
Drive Image® Pro encrypted file
PQVF.VFD
Virtual Floppy™ binary
RESTORE.TXT
Script file for system restore, in c:/windows/desktop/temp/
    dipro4, e.g.:
SELECT DRIVE 1
SELECT PARTITION FIRST
DELETE
SELECT FREESPACE FIRST
SELECT IMAGE ALL
RESTORE
Directory of C:\WINDOWS\Desktop\temp\DIPro4\Floppy
ARCCD.SYS
CD-Rom driver
AUTOEXEC.BAT
Autoexec.bat batch file, e.g.:
@echo off
path=.;a:\tools;a.:\;g:\;g:\tools
mscdex /d:arccd01 /l:g
rem This batch process deletes the primary partition and
rem restores the image file from CD which contains the new
    OS.
:restore
rem Restore Drive Image Pro Image
@echo off
cls
g:
cd\dipro4
echo.
echo.
echo Deploying New Operating System Image
pqdi /cmd=restore.txt /img=g:\image\win2k.pqi /ipe /ifc
CONFIG.SYS
Config.sys, e.g.:
LASTDRIVE=Z
DEVICE=A:\HIMEM.SYS
DEVICE=A:\arccd.SYS
HIMEM.SYS
Himem driver
MSCDEX.EXE
Microsoft CD-Rom extensions file
Directory of C:\WINDOWS\Desktop\temp\PQMagic
MOUSE.COM
Mouse driver
MOUSE.INI
Mouse driver config file
PMHELP.DAT
PartitionMagic® help file
PQBOOT.EXE
PQBoot executable to activate and boot partitions
PQDATA.002
Temp file
PQMAGIC.EXE
PartitionMagic® main executable
PQMAGIC.OVL
PartitionMagic® overlay file
PQMAGIC.PIF
.PIF file for running PartitionMagic® from a DOS Window
PQMAGIC.PQG
PartitionMagic® associate file
PQPB.RTC
PartitionMagic® configuration file
PQTMP.FIL
Temp file
PQVF.VFD
Virtual FLOPPY™ binary for PartitionMagic® program
PQVXD.VXD
Virtual Floppy™ associate file
PQDEBUG.TXT
Debug file
RESCUE.TXT
Rescue disks help info
RESIZE.TXT
Resize partitions script, e.g.:
Select Disk 1
Select Partition 1
Check
Resize Smaller 50
Select Unallocated Largest
Create /FS=Extended
Select Unallocated Largest
Create /FS=FAT /Label="CLNSTART"
RESTRMBR.EXE
Restore MBR executable for Virtual Floppy™ software
SCRLOG.TXT
Log file
TEST.LOG
Log file
VFINST9X.EXE
Virtual Floppy™ software installation program for Windows
    operating systems
VFLOPPY.SYS
Virtual Floppy™ software SYS driver
VFLPPYLD.SYS
Virtual Floppy™ software loader
VSSVER.SCC
Virtual Floppy™ software file
Directory of C:\WINDOWS\Desktop\temp\PQMagic\Floppy
ARCCD.SYS
CD-Rom driver
AUTOEXEC BAT 543 11-08-00 12:14a autoexec.bat
Autoexec.bat, e.g.:
@echo off
path=.;a:\tools;a:\;G:\;g:\tools
MSCDEX /D:arccd01 /L:G
rem This batch process creates the extended partition
rem which will hold the SMA output files for the
rem Clean Start Process and then copies Clean Start files
rem for System Migration.
:create
rem Create Extended Partition
@echo off
```

```
cls
echo.
echo.
echo Creating Temporary Storage Area
G:
cd\pqmagic
pqmagic /cmd=resize.txt /nrb
rem Copy Files to Extended Partition
CD\TOOLS
PQFILE /F copysma.TXT
restrmbr
g:\pqmagic\pqboot /p:1
COMMAND.COM
```
Command.com
CONFIG.SYS
Config.sys; e.g.:
LASTDRIVE=Z
Device=a:\himem.sys
DEVICE=A:\arccd.SYS
HIMEM.SYS
Himem driver
MIGRATE.BAT
Batch file to migrate system settings to temporary partition,
  e.g.:
```
:Migrate
rem Launch SMA to Migrate Personality to Extended Par-
  tition
D:
CD\clnstart
cls
echo.
echo.
echo Capturing PC personality using IBM SMA
echo.
srcbat /c source.txt /o d:\clnstart
echo.
echo Personality capture complete.
echo.
echo Booting to Virtual Floppy . . .
copy E:\dipro4\*.vfd c:\
c:
cd\
vinst9x
```
MSCDEX.EXE
Microsoft CD extensions
NW24XCD.SYS
CD-Rom driver
RESTRMBR.EXE
Restore MBR executable for Virtual Floppy™ software
Directory of C:\WINDOWS\Desktop\temp\SMA
RESTORE.BAT
Batch file to restore migrated data/settings, e.g.:
```
:Restore
rem SMA Migration Start
cls.
echo Restoring PC personality using IBM SMA
echo.
tarbat /f d:\clnstart\output.sma /c restore.txt
echo.
echo Personality restore complete.
```
RESTORE.TXT
Restore configuration file for SMA software
RESTRMBR.EXE
Restore MBR executable for Virtual Floppy™ software
SOURCE.EXE
IBM SMA Source (capture) executable for saving system
  data/settings
SOURCE.TXT
IBM SMA Source (capture) config file for saving system
  data/settings
SRCBAT.EXE
IBM SMA Source (capture) executable for scripted opera-
  tion
SRCCOMMANDS.TXT
Configuration file for source process
TARBAT.EXE
IBM SMA Target (restore) executable for scripted restores
  of system data/settings
TARCOMMANDS.TXT
IBM SMA Target (restore) executable for restoring system
  data/settings
TARGET.EXE
IBM SMA Target (restore) executable for restoring system
  data/settings
UNINST.ISU
Uninstall file
USERPRIV.DLL
User privileges file
ZLIB.DLL
ZLib compression file
Directory of C:\WINDOWS\Desktop\temp\Tools
COPYSMA.TXT
PQFile script file to copy SMA files to the new partition,
  e.g.:
/MKDIR 2:\CLNSTART
/COPY g:\SMA\*.* 2:\CLNSTART\*.* PQIO
/COPY A:\MIGRATE.BAT
0:\WINDOWS\STARTM~1\PROGRAMS\STARTUP\MIGRATE.BAT
  PQIO
PQFILE.EXE
PQFile executable for DOS functions on non-DOS partitions
PQFILE9X.EXE
PQFile executable for DOS functions on non-DOS partitions
  (Windows Version)
PQVXD.VXD
Virtual Floppy™ software VXD
RESTRMBR.EXE
Restore MBR executable for Virtual Floppy™ software
SCRIPT.TXT
Script file sample for PQFile, e.g.:
/MKDIR 2:\CLNSTART PQIO
/COPY g:\SMA\*.* 2:\CLNSTART\*.* PQIO
/COPY A:\MIGRATE.BAT
0:\WINDOWS\STARTM~1\PROGRAMS\STARTUP\MIGRATE.BAT
  PQIO
SHOW.TXT
PQFile /Show output to identify partitions, e.g.:

```
**************************************************
******
PQFILE v1.07 - Generic File Access Program
Copyright (c) 1999–2000 PowerQuest Corporation. All rights reserved.
**************************************************
******
================================ Disk 1
================================
```

| Volume ID | Type | Status | Size MB | Used MB | Free MB |
|---|---|---|---|---|---|
| *:0 | FAT | Primary | 51.6 | 15.5 | 36.2 |
| C:1 | FAT-32 | Primary, Bootable | 6961.10 | 3754.5 | 3207.5 |
| *: | Extended | Primary | 17187.2 | 13030.7 | 4156.5 |

-continued

```
**************************************************************
******
PQFILE v1.07 - Generic File Access Program
Copyright (c) 1999–2000 PowerQuest Corporation. All rights reserved.
**************************************************************
******
================================== Disk 1
==================================
```

| Volume ID | Type | Status | Size MB | Used MB | Free MB |
|---|---|---|---|---|---|
| 2 D:DATA | FAT-32 | Logical | 13030.6 | 9268.2 | 3762.5 |
| 3 *: | Free Space | Logical | 4156.5 | 0.0 | 4156.5 |
| 4 | | | | | |

VFILE.EXE
VFile executable for updating the Virtual Floppy™ binary

Of course, other embodiments of the invention can be configured differently than the bootable CD example described above.

SUMMARY

The present invention provides tools and techniques to facilitate migration of user profiles to a newly imaged partition on a computer 100. Partition manipulations are used to find space on the computer 100 to temporarily hold the user profile so it is not destroyed by the imaging. Because the invention performs the profile migration to the new image "in place" on the computer 100, space on a network server is not needed to hold client profiles. The in place migration can also be initiated remotely using IBM's LCCM or a similar tool, and migrations can proceed in parallel on multiple clients 100 without requiring synchronization between the clients. Moreover, the in place migration permits user profile migration on a computer 100 that has no current network connection, without requiring supplemental temporary storage such as a tape drive.

Although particular embodiments of the present invention are expressly illustrated and described individually herein, it will be appreciated that discussion of one type of embodiment also extends to other embodiment types. All claims as filed are part of the specification and thus help describe the invention, and repeated claim language may be inserted outside the claims as needed. Although Microsoft Windows operating systems are discussed as examples, other operating systems may also be used according to the invention. Likewise, the invention is useful with a variety of file systems, not merely the file systems that are typically used with Microsoft Windows operating systems.

As used herein, terms such as "a" and "the" and designations such as "file", "partition", and "image" are inclusive of one or more of the indicated element. In particular, in the claims a reference to an element generally means at least one such element is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for coordinating imaging operations with user profile migration to perform migration in place on a computer system, the method comprising the steps of:

providing a migration content storage partition in the computer system to hold migration content, by using a partition manipulation tool to manipulate at least one partition in a partitionable storage medium of the computer system;

saving migration content into the provided migration content storage partition by using a migration tool, the saved migration content including at least user settings for the computer system;

deploying an image into at least one other partition of the computer system's partitionable storage by using an imaging tool, thereby forming a newly imaged partition which is not the migration content storage partition;

restoring migration content from the migration content storage partition into the newly imaged partition by using the migration tool; and deleting the migration content storage partition after restoring migration content from the migration content storage partition into the newly imaged partition.

2. The method of claim 1, further comprising the step of deleting at least one file from the partitionable storage medium of the computer system to make additional room for migration content.

3. The method of claim 1, wherein the method comprises rebooting the computer system, and the reboot causes execution of commands that include an invocation of the imaging tool during the deploying step.

4. The method of claim 3, wherein the rebooting step reboots the computer system from a bootable removable storage medium.

5. The method of claim 3, wherein the rebooting step reboots the computer system using a network boot image which is dynamically downloaded for that boot over a network to the computer system.

6. The method of claim 1, wherein the method comprises rebooting the computer system, and the reboot causes execution of commands that include an invocation of the migration tool during the migration content restoring step.

7. The method of claim 6, wherein the invocation of the migration tool results from an entry in an operating system registry.

8. The method of claim 1, wherein the step of providing a migration content storage partition comprises determining whether the computer system's partitionable storage has an extended partition.

9. The method of claim 8, wherein the step of providing a migration content storage partition comprises creating an extended partition to hold migration content after the determining step determined that the computer system's partitionable storage lacked an extended partition.

10. The method of claim 1, wherein the step of providing a migration content storage partition comprises shrinking a partition on the computer system's partitionable storage to provide storage space for use in the migration content storage partition.

11. The method of claim 1, wherein the step of deploying an image deploys an image of an operating system which was not installed on the computer system at a point in time one minute immediately before the deploying step began.

12. The method of claim 1, wherein the step of deploying an image deploys an image of an operating system upgrade which upgrades an operating system that was already installed on the computer system before the deploying step.

13. The method of claim 1, wherein the step of deploying an image deploys a rollback image which rolls the image receiving partition back to an earlier state.

14. A collection of one or more computer-readable storage media configured to perform a method for coordinating imaging operations with user profile migration on a computer system, the method comprising the steps of:

provided a migration content storage partition in the computer system to hold migration content, by using a partition manipulation tool to resize at least one partition in a partitionable storage medium of the computer system;

saving migration content into the provided migration content storage partition by using a migration tool, the saved migration content including at least user settings for the computer system;

deploying an image into at least one other partition of the computer system's partitionable storage by using an imaging tool, thereby forming a newly imaged partition which is not the migration content storage partition;

restoring migration content from the migration content storage partition into the newly imaged partition by using the migration tool; and deleting the migration content storage partition after restoring migration content from the migration content storage partition into the newly imaged partition.

15. The configured media of claim 14, wherein the method further comprises the step of deleting at least one file from the partitionable storage medium of the computer system to make additional room for migration content.

16. The configured media of claim 14, wherein the method comprises rebooting the computer system, and the reboot causes execution of commands that include an invocation of the imaging tool during the deploying step.

17. The configured media of claim 14, wherein the configured media comprise a bootable removable storage medium.

18. The configured media of claim 14, wherein the method comprises rebooting the computer system, and the reboot causes execution of commands that include an invocation of the migration tool during the migration content restoring step.

19. The configured media of claim 14, wherein the method comprises determining whether the computer system's partitionable storage has an extended partition.

20. The configured media of claim 14, wherein the method comprises creating an extended partition in the computer system's partitionable storage.

21. The configured media of claim 14, wherein the providing step comprises shrinking the partition that will receive the image, in order to provide storage space for use in the migration content storage partition.

22. The configured media of claim 14, wherein the step of deploying an image deploys an image of an operating system which was not installed on the computer system before the deploying step began.

23. The configured media of claim 14, wherein the step of deploying an image deploys an image of an operating system upgrade which upgrades an operating system that was already installed on the computer system before the deploying step.

24. The configured media of claim 14, wherein the step of deploying an image deploys a rollback image which rolls the image receiving partition back to an earlier state.

* * * * *

UNITED STATES PATENT AND TRADEMARK OFFICE
CERTIFICATE OF CORRECTION

PATENT NO.    : 6,920,555 B1
DATED         : July 19, 2005
INVENTOR(S)   : Chuck Peters and Steve Fairbanks It is certified that error appears in the above-identified patent and that said Letters Patent is hereby corrected as shown below:

Column 7,
Line 15, change "102'" to -- 102 --.

Column 8,
Line 2, change "106" to -- 206 --.

Column 15,
Line 12, change "end" to -- :end --.
Lines 58 to 60, remove reading:
  "[WIN2K]
     DEVICE=C:\DOS\HIMEM.SYS
     DEVICE=C:\DOS\OAKCDROM.SYS/D:CD01".

Column 18,
Line 23, change "PQDEBUG.TXT" to -- PQ_DEBUG.TXT --.

Signed and Sealed this

Twenty-fourth Day of January, 2006

JON W. DUDAS
*Director of the United States Patent and Trademark Office*